(12) United States Patent
Zhao et al.

(10) Patent No.: US 10,432,924 B2
(45) Date of Patent: Oct. 1, 2019

(54) THREE-DIMENSIONAL DISPLAY DEVICE AND DRIVING METHOD THEREOF

(71) Applicants: Boe Technology Group Co., Ltd., Beijing (CN); Beijing Boe Optoelectronics Technology Co., Ltd., Beijing (CN)

(72) Inventors: Wenqing Zhao, Beijing (CN); Xue Dong, Beijing (CN); Xiaochuan Chen, Beijing (CN); Pengcheng Lu, Beijing (CN); Lei Wang, Beijing (CN); Qian Wang, Beijing (CN); Jian Gao, Beijing (CN); Ming Yang, Beijing (CN); Xiaochen Niu, Beijing (CN); Rui Xu, Beijing (CN); Haisheng Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 78 days.

(21) Appl. No.: 15/503,036

(22) PCT Filed: Sep. 2, 2016

(86) PCT No.: PCT/CN2016/097846
§ 371 (c)(1),
(2) Date: Feb. 10, 2017

(87) PCT Pub. No.: WO2017/092453
PCT Pub. Date: Jun. 8, 2017

(65) Prior Publication Data
US 2017/0272738 A1 Sep. 21, 2017

(30) Foreign Application Priority Data
Dec. 3, 2015 (CN) .......................... 2015 1 0884515

(51) Int. Cl.
H04N 13/324 (2018.01)
H04N 13/356 (2018.01)
(Continued)

(52) U.S. Cl.
CPC ......... *H04N 13/398* (2018.05); *G02B 27/225* (2013.01); *G02B 27/2214* (2013.01);
(Continued)

(58) Field of Classification Search
None
See application file for complete search history.

(56) References Cited

U.S. PATENT DOCUMENTS 6,791,570 B1 9/2004 Schwerdtner et al.
9,330,615 B2 * 5/2016 Sone .................... G09G 3/3607
(Continued)

FOREIGN PATENT DOCUMENTS

CN 101101378 A 1/2008
CN 101995667 A 3/2011
(Continued)

OTHER PUBLICATIONS

International Search Report for PCT/CN2016/097846 dated Nov. 28, 2016.
(Continued)

*Primary Examiner* — Michael J Hess
(74) *Attorney, Agent, or Firm* — Calfee, Halter & Griswold LLP

(57) ABSTRACT

Embodiments of the present disclosure disclose a three-dimensional display device and a driving method thereof. Under the three-dimensional display mode, a plurality of light emitting areas and a plurality of black areas arranged alternately in row direction and column direction are formed in the electroluminescent display panel, and the light emitting area comprises repeatedly arranged R light emitting (Continued)

areas, G light emitting areas, B light emitting areas and X light emitting areas. Under the three-dimensional display mode, by controlling first sub-pixels corresponding to the same light emitting area for providing gray scale information of different viewpoint images to display different gray scale information, the left and right eyes of a person can receive images with different gray scale information when being located at two viewpoints respectively, so as to generate stereoscopic vision and realize naked eye 3D display in a sub-pixel level.

18 Claims, 4 Drawing Sheets

(51) Int. Cl.
*G02F 1/1335* (2006.01)
*H04N 13/32* (2018.01)
*G02B 27/22* (2018.01)
*H04N 13/398* (2018.01)
*H04N 13/302* (2018.01)
*G02F 1/1343* (2006.01)
*G09G 3/00* (2006.01)
*G09G 3/20* (2006.01)
*G09G 3/30* (2006.01)
*G09G 3/36* (2006.01)

(52) U.S. Cl.
CPC .. *G02F 1/133512* (2013.01); *G02F 1/133621* (2013.01); *G02F 1/134336* (2013.01); *G09G 3/003* (2013.01); *G09G 3/20* (2013.01); *G09G 3/2003* (2013.01); *G09G 3/2074* (2013.01); *G09G 3/30* (2013.01); *G09G 3/3607* (2013.01); *G09G 3/3611* (2013.01); *H04N 13/302* (2018.05); *H04N 13/32* (2018.05); *H04N 13/324* (2018.05); *H04N 13/356* (2018.05); *G02F 2001/134345* (2013.01); *G02F 2201/44* (2013.01); *G02F 2201/52* (2013.01); *G02F 2203/30* (2013.01); *G09G 2300/0452* (2013.01); *G09G 2320/0209* (2013.01)

(56) References Cited

U.S. PATENT DOCUMENTS

| | | | | |
|---|---|---|---|---|
| 2007/0236619 | A1* | 10/2007 | Kuo | G02B 27/2214 349/15 |
| 2008/0266318 | A1* | 10/2008 | Peeters | G09G 3/3607 345/603 |
| 2010/0073465 | A1 | 3/2010 | Park et al. | |
| 2010/0309296 | A1* | 12/2010 | Harrold | G02B 27/2214 348/54 |
| 2011/0043715 | A1 | 2/2011 | Ohyama et al. | |
| 2012/0050857 | A1* | 3/2012 | Lee | H04N 13/31 359/464 |
| 2013/0169694 | A1 | 7/2013 | Chen et al. | |
| 2016/0234487 | A1* | 8/2016 | Kroon | G02B 27/2214 |
| 2017/0269357 | A1* | 9/2017 | Murao | G02B 27/0093 |

FOREIGN PATENT DOCUMENTS

| | | |
|---|---|---|
| CN | 103185984 A | 7/2013 |
| CN | 105093546 A | 11/2015 |
| CN | 105093547 | 11/2015 |
| CN | 105093548 | 11/2015 |
| CN | 105093553 | 11/2015 |
| CN | 105319775 | 2/2016 |
| CN | 105334632 | 2/2016 |
| CN | 105353559 | 2/2016 |
| CN | 105425408 | 3/2016 |
| CN | 105681778 | 6/2016 |

OTHER PUBLICATIONS

First Office Action for Chinese Patent Application No. 201510884515.7 dated Jan. 31, 2018.

Second Office Action for Chinese Patent Application No. 201510884515.7 dated May 10, 2018.

* cited by examiner

| r1 | r2 | g1 | g2 | r1 | r2 |
|----|----|----|----|----|----|
| x1 | x2 | b1 | b2 | x1 | x2 |
| r1 | r2 | g1 | g2 | r1 | r2 |
| x1 | x2 | b1 | b2 | x1 | x2 |

Fig. 6

| r1 | r2 | g1 | g2 | r1 | r2 |
|----|----|----|----|----|----|
| x2 | x1 | b2 | b1 | x2 | x1 |
| r1 | r2 | g1 | g2 | r1 | r2 |
| x2 | x1 | b2 | b1 | x2 | x1 |

Fig. 7

| x2 | x1 | x2 | x1 |
|----|----|----|----|
| r1 | r2 | r1 | r2 |
| b2 | b1 | b2 | b1 |
| g1 | g2 | g1 | g2 |
| x2 | x1 | x2 | x1 |
| r1 | r2 | r1 | r2 |

Fig. 8

THREE-DIMENSIONAL DISPLAY DEVICE AND DRIVING METHOD THEREOF

RELATED APPLICATIONS

The present application is the U.S. national phase entry of PCT/CN2016/097846, with an international filing date of Sep. 2, 2016, which claims the benefit of Chinese Patent Application No. 201510884515.7, filed on Dec. 3, 2015, the entire disclosure of which is incorporated herein by reference.

TECHNICAL FIELD

The present disclosure relates to the field of three-dimensional display technology, particularly to a three-dimensional display device and a driving method thereof.

BACKGROUND

The main principle of the three-dimensional (3D) display technology is enabling the left eye and the right eye of a viewer to receive images with minute differences respectively, i.e., left view and right view. The two views are integrated after being analyzed by the brain so as to enable the viewer to perceive the depth of the image object, thereby generating stereo perception.

The earlier 3D display device requires the user to wear corresponding 3D glasses. The naked eye 3D display device has attracted much attention in recent years. There are generally two types of naked eye 3D display devices: slit grating type 3D display devices and micro lens array type 3D display devices. The slit grating device is also called parallax barrier, which is generally realized using a switch liquid crystal screen, a high molecule liquid crystal layer and a polarizing film. By controlling the voltage difference between the electrodes of the upper and lower substrates in the switch liquid crystal screen, the liquid crystal molecules in the high molecule liquid crystal layer are rotated to form opaque stripes, i.e., parallax barrier. When the liquid crystal screen switch is turned on, under the effect of the parallax barrier, the left eye image can only be seen by the left eye, while the right eye is blocked. The right eye image can only be seen by the right eye, while the left eye is blocked. When the liquid crystal screen switch is turned off, the display panel will not have parallax barrier, thereby becoming a common 2D display.

At present, the existing naked eye three-dimensional display device has to add additional 3D gratings that can realize parallax barrier in front of the display panel, which does not benefit thinness of the three-dimensional display device.

SUMMARY

Therefore, it is desired to provide a light and thin three-dimensional display device and a driving method thereof.

According to a first aspect, embodiments of the present disclosure provide a three-dimensional display device, comprising: a liquid crystal display panel, and an electroluminescent display panel arranged under the liquid crystal display panel. The electroluminescent display panel comprises a plurality of first areas and a plurality of second areas. The plurality of first areas and the plurality of second areas are arranged in array and arranged alternately in row direction and column direction. Under a three-dimensional display mode, the plurality of first areas are light emitting areas, and the plurality of second areas are black areas. And the light emitting areas comprises repeatedly arranged R light emitting areas, G light emitting areas, B light emitting areas and X light emitting areas. The liquid crystal display panel comprises a plurality of first sub-pixels arranged in array. At least every two first sub-pixels adjacent in row direction correspond to a first area. Under the three-dimensional display mode, first sub-pixels corresponding to a same first area are used for providing gray scale information of different viewpoint images, and gray scales displayed by the first sub-pixels corresponding to the same first area are controlled to be different from each other to enable the three-dimensional display.

In a possible implementation, the electroluminescent light emitting display panel comprises a plurality of pixels. Each pixel comprises an R light emitting area, a G light emitting area, an X light emitting area, a B light emitting area located in two adjacent rows or columns respectively.

In a possible implementation, under a two-dimensional display mode, gray scales displayed by first sub-pixels corresponding to the same first area are all the same.

In a possible implementation, the liquid crystal display panel is a black and white liquid crystal display panel.

In a possible implementation, the X light emitting area is one of an R light emitting area, a B light emitting area, a G light emitting area, a Y light emitting area and a W light emitting area.

In a possible implementation, under a two-dimensional display mode, the plurality of second areas in the electroluminescent display panel are black areas.

In a possible implementation, each of the plurality of first areas is a second sub-pixel and each of the plurality of second areas is an area covered by a black matrix.

In a possible implementation, under a two-dimensional display mode, each of the plurality of second areas in the electroluminescent display panel is a light emitting area that emits light of the same color as one of two first areas adjacent to the second area in the row direction.

In a possible implementation, each of the plurality of first areas is a second sub-pixel and each of the plurality of second areas is a second sub-pixel.

In a possible implementation, a central position of each first area overlaps with a central position of a line from a center of one corresponding first sub-pixel to a center of another corresponding first sub-pixels.

In a possible implementation, a central position of each first area overlaps with a central position of one of at least two corresponding first sub-pixels.

In a possible implementation, a shape of the first area is square, diamond or round, and a length-width ratio of the first sub-pixel is 1:1.

According to a second aspect, embodiments of the present disclosure further provide a driving method of the above three-dimensional display device, comprising:

under a three-dimensional display mode, controlling a plurality of first areas in an electroluminescent display panel to perform light emitting display, and controlling a plurality of first sub-pixels of a liquid crystal display panel, so as to enable first sub-pixels corresponding to a same first area to provide gray scale information of different viewpoint images and enable first sub-pixels corresponding to a same first area to display different gray scale information.

In a possible implementation, the driving method provided by embodiments of the present disclosure further comprises: under a two-dimensional display mode, controlling first sub-pixels corresponding to a same first area in the liquid crystal display panel to display the same gray scale information.

In a possible implementation, each of the plurality of first areas is a second sub-pixel and each of the plurality of second areas is a second sub-pixel. The driving method further comprises: under a two-dimensional display mode, controlling each of the plurality of second areas in the electroluminescent display panel to perform the same light emitting display as one of two first areas adjacent to the second area in row direction.

In a possible implementation, a central position of each first area overlaps with a central position of one of at least two corresponding first sub-pixels. The driving method further comprises: under a three-dimensional display mode, when it is determined that screen of the three-dimensional display device rotates, redetermining corresponding relations of the plurality of first areas and the plurality of first sub-pixels.

Embodiments of the present disclosure provide a three-dimensional display device and a driving method thereof. An electroluminescent display panel is used to replace the conventional backlight and is arranged under the liquid crystal display panel; thus, the whole three-dimensional display device can be light and thin. Under the three-dimensional display mode, a plurality of light emitting areas and a plurality of black areas arranged alternately in row direction and column direction are formed in the electroluminescent display panel, and the plurality of light emitting areas comprise repeatedly arranged R light emitting areas, G light emitting areas, B light emitting areas and X light emitting areas. Thus, a special shaped grating structure is formed. The electroluminescent display panel further has the function of postpositive three-dimensional gratings in addition to providing back light of the liquid crystal display panel, thereby saving the additional three-dimensional grating added in front of the liquid crystal display panel, which benefits the overall light and thin design of the three-dimensional display device and the prepositive liquid crystal display panel to add functions such as the touch function. Moreover, because the brightness of the electroluminescent display panel is approximately zero in the black state, and the contrast of the black and white state is relatively high, the three-dimensional gratings formed can easily obtain three-dimensional display of low crosstalk. Because each light emitting area (first area) in the electroluminescent display panel corresponds to at least two first sub-pixels in the liquid crystal display panel, and the respective first sub-pixels are used for providing gray scale information of different viewpoint images, under the three-dimensional display mode, by controlling first sub-pixels corresponding to the same light emitting area (first area) for providing gray scale information of different viewpoint images to display different gray scale information, two different viewpoints (for example, two adjacent viewpoints) can receive images with different gray scale information. The left and right eye of a person will receive two different images when being located at two viewpoints respectively, which are then converged to one image in the brain by the vision of two eyes, so as to generate stereoscopic vision and realize naked eye 3D display of sub-pixel level.

BRIEF DESCRIPTION OF THE DRAWINGS

FIG. 6 to FIG. 8 are vertical schematic views of a three-dimensional display device provided by embodiments of the present disclosure.

DETAILED DESCRIPTION

Figure 1:
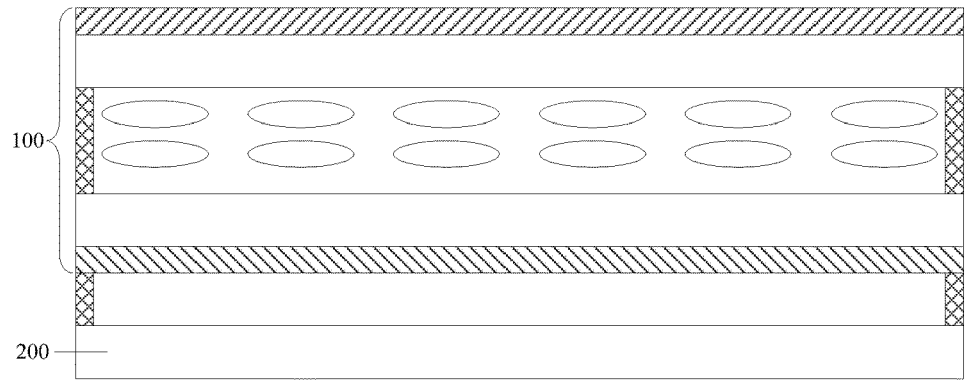
FIG. 1 is a structural schematic view of a three-dimensional display device provided by embodiments of the present disclosure.

Next, the specific implementation of the three-dimensional display device and the driving method thereof provided by embodiments of the present disclosure will be explained in detail with reference to the drawings.

The shapes of the areas in the drawings do not reflect the real proportions, which only aim to schematically explaining the content of the present disclosure.

Embodiments of the present disclosure provide a three-dimensional display device, as shown in FIG. 1, comprising: a liquid crystal display panel 100, and an electroluminescent display panel 200 arranged under the liquid crystal display panel 100.

Figure 2A:
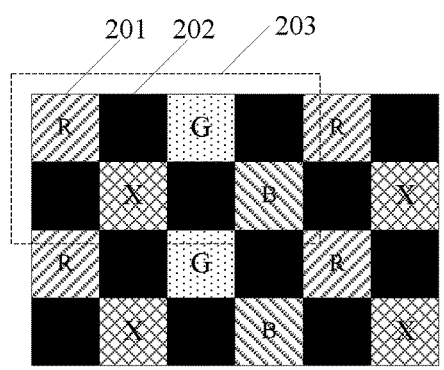
FIG. 2a and FIG. 2b are schematic views of an electroluminescent display panel in a three-dimensional display device provided by embodiments of the present disclosure respectively.
Figure 2B:
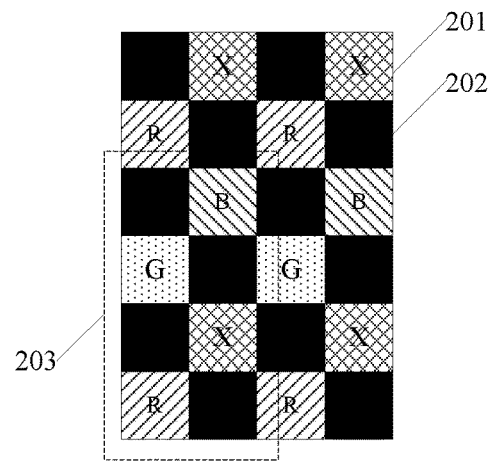

As shown in FIG. 2a and FIG. 2b, the electroluminescent display panel 200 comprises a plurality of first areas 201 and a plurality of second areas 202. The plurality of first areas 201 and the plurality of second areas 202 are arranged in array and arranged alternately in row direction and column direction. Under a three-dimensional display mode, the plurality of first areas 201 are light emitting areas, and the plurality of second areas 202 are black areas. And the light emitting areas comprises repeatedly arranged R light emitting areas, G light emitting areas, B light emitting areas and X light emitting areas. The X light emitting area for example is one of an R light emitting area, a B light emitting area, a G light emitting area, a Y light emitting area and a W light emitting area. As shown in FIG. 2a and FIG. 2b, the liquid crystal display panel 200 can comprise a plurality of pixels 203, each of which comprises an R light emitting area, a G light emitting area, an X light emitting area, a B light emitting area located in two adjacent rows or columns respectively. FIG. 2a shows the case in which the pixels 203 in the electroluminescent display panel 200 comprises an R light emitting area, a G light emitting area, an X light emitting area, a B light emitting area located in two adjacent rows respectively. FIG. 2b shows the case in which the pixels 203 in the electroluminescent display panel 200 comprises an R light emitting area, a G light emitting area, an X light emitting area, a B light emitting area located in two adjacent columns respectively.

Figures 3A, 3B, 4:
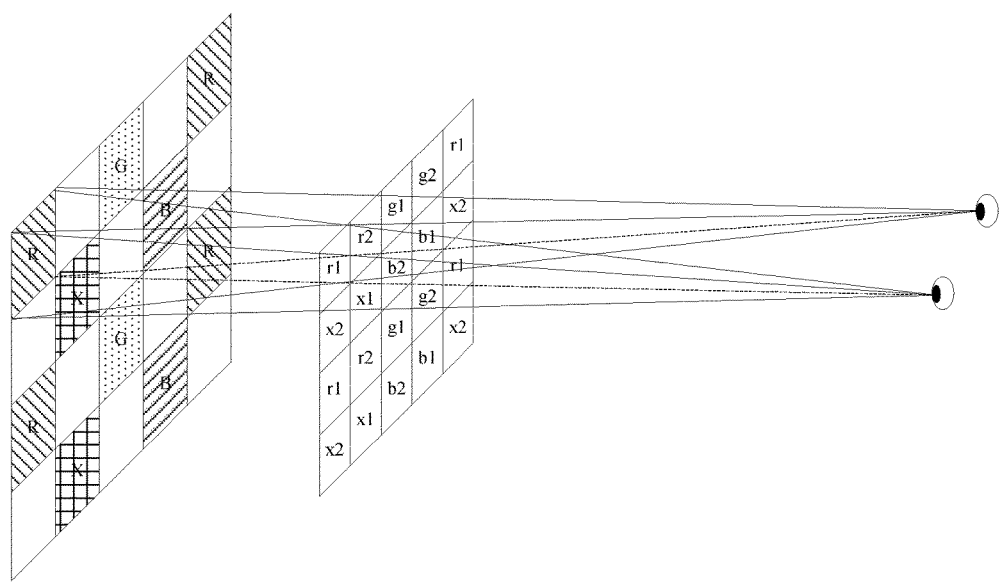
FIG. 3a and FIG. 3b are schematic views of a liquid crystal display panel in a three-dimensional display device provided by embodiments of the present disclosure respectively.
FIG. 4 is a schematic view of stereoscopic principle of a three-dimensional display device provided by embodiments of the present disclosure.

As shown in FIG. 3a and FIG. 3b, the liquid crystal display panel 100 comprises a plurality of first sub-pixels 101 arranged in array. At least every two first sub-pixels 101 adjacent in row direction correspond to a first area 201. Under the three-dimensional display mode, first sub-pixels 101 corresponding to a same first area 201 as shown in FIG. 2a and FIG. 2b are used for providing gray scale information of different viewpoint images, and gray scales displayed by the first sub-pixels 101 corresponding to the same first area 201 are different from each other. FIG. 3a and FIG. 3b illustrate examples that one first area 201 corresponds to two first sub-pixels 101 adjacent in row direction. FIG. 3a is an arrangement of first sub-pixels 101 corresponding to the light emitting area (first area 201) as shown in FIG. 2a. FIG. 3b is an arrangement of first sub-pixels 101 corresponding to the light emitting area (first area 201) as shown in FIG. 2b. The first sub-pixels r1 and r2 adjacent in row direction in the liquid crystal display panel 100 correspond to the light emitting area R in the electroluminescent display panel 200. The first sub-pixels g1 and g2 correspond to the light emitting area G. The first sub-pixels b1 and b2 correspond to the light emitting area B. The first sub-pixels x1 and x2 correspond to the light emitting area X.

The above three-dimensional display device provided by embodiments of the present disclosure uses the electroluminescent display panel 200 to replace the conventional arrangement in which backlight is under the liquid crystal display panel 100; thus, the whole three-dimensional display device can be light and thin. Under the three-dimensional display mode, a plurality of light emitting areas and a plurality of black areas arranged alternately in row direction and column direction are formed in the electroluminescent display panel 200, and the plurality of light emitting areas comprise repeatedly arranged R light emitting areas, G light emitting areas, B light emitting areas and X light emitting areas. Thus, a special shaped grating structure is formed. The electroluminescent display panel 200 further has the function of postpositive three-dimensional gratings in addition to providing back light of the liquid crystal display panel 100, thereby saving the additional three-dimensional grating added in front of the liquid crystal display panel 100, which benefits the overall light and thin design of the three-dimensional display device and the prepositive liquid crystal display panel 100 to add functions such as the touch function. Moreover, because the brightness of the electroluminescent display panel 200 is approximately zero in the black state, and the contrast of the black and white state is relatively high, the three-dimensional gratings formed can easily obtain three-dimensional display of low crosstalk.

Figure 5A:
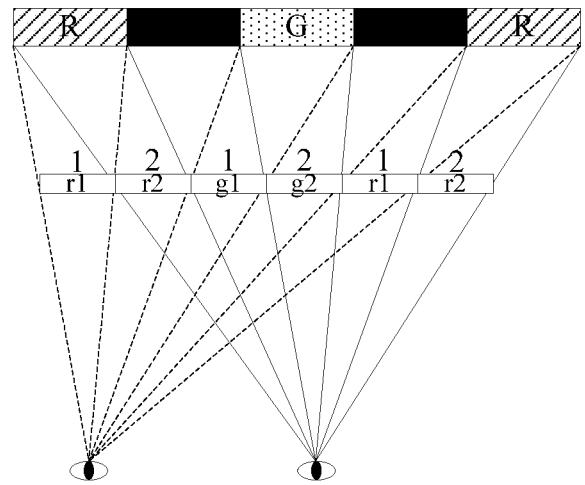
FIG. 5a and FIG. 5b are schematic views of principle when a three-dimensional display device provided by embodiments of the present disclosure performs three-dimensional display respectively.

In the above three-dimensional display device provided by embodiments of the present disclosure, as shown in FIG. 4, because each light emitting area (first area 201) in the electroluminescent display panel 200 corresponds to at least two first sub-pixels 101 adjacent in the row direction in the liquid crystal display panel 100, and the respective first sub-pixels 101 are used for providing gray scale information of different viewpoint images, as shown in FIG. 5, under the three-dimensional display mode, by controlling first sub-pixels 101 corresponding to the same light emitting area (first area 201) for providing gray scale information of different viewpoint images to display different gray scale information, two adjacent viewpoints can receive images with different gray scale information. The left and right eye of a person will receive two different images when being located at two viewpoints respectively, which are then converged to one image in the brain by the vision of two eyes, so as to generate stereoscopic vision and realize naked eye 3D display of sub-pixel level. FIG. 5a shows the case in which two viewpoints are realized by taking an example that one light emitting area corresponds to two first sub-pixels. "1" and "2" are used to represent different gray scales respectively. The left eye receives image information with the gray scale of 1, and the right eye receives image information with the gray scale of 2. In specific implementation, one light emitting area can correspond to three first sub-pixels, i.e., realizing three viewpoints. One light emitting area can also correspond to four first sub-pixels to realize four viewpoints or two viewpoints (two adjacent first sub-pixels corresponding to one viewpoint), and so on.

Figure 5B:
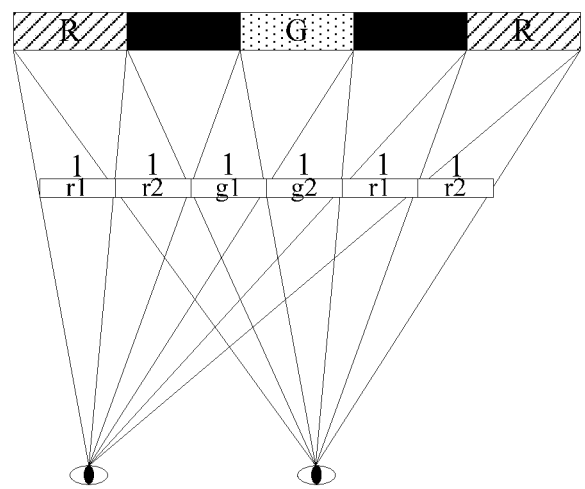

Further, when the three-dimensional display device needs to perform two-dimensional image display, i.e., under a two-dimensional display mode, as shown in FIG. 5b, the left eye and right eyes of the person can see two images of the same at different viewpoints as long as the respective first sub-pixels 101 corresponding to the same light emitting area (first area 201) in the liquid crystal display panel 100 are adjusted to display the same gray scale, so as to realize two-dimensional display. FIG. 5b shows the case in which two viewpoints are realized by taking an example that one light emitting area corresponds to two first sub-pixels, wherein "1" represents the same gray scale.

According to another embodiment, the liquid crystal display panel 100 is a black and white liquid crystal display panel, i.e., color filter is not arranged in the liquid crystal display panel 100. In this way, the light transmittance of the three-dimensional display device can be increased on the one hand, on the other hand, direction problem will not occur when the three-dimensional display device realizes three-dimensional display due to arrangement of color filter. Hence, the black and white liquid crystal display panel can still realize three-dimensional display after being rotated 90 degrees.

Specifically, in the three-dimensional display device provided by embodiments of the present disclosure, the positional relation between the light emitting areas (first area 201) in the electroluminescent display panel 200 and the corresponding first sub-pixels 101 in the liquid crystal display panel 100 can be implemented in various ways.

A possible implementation is: as shown in FIG. 6, a central position (represented by circles in FIG. 6) of each first area 201 (light emitting area) overlaps with a central position of a line from a center of one corresponding first sub-pixel to a center of another corresponding first sub-pixels 101 adjacent in the row direction. FIG. 6 illustrates an example that each first area 201 corresponds to two first sub-pixels 101 adjacent in the row direction. The first sub-pixels r1 and r2 correspond to the light emitting area R. The first sub-pixels g1 and g2 correspond to the light emitting area G. The first sub-pixels b1 and b2 correspond to the light emitting area B. The first sub-pixels x1 and x2 correspond to the light emitting area X. In such an implementation, the viewer can see a three-dimensional image as long as being at the central normal of the screen. However, three-dimensional display cannot be realized after the screen is rotated 90 degrees. Hence, such an implementation can only realize three-dimensional display in one direction (landscape or portrait).

Another possible implementation is: as shown in FIG. 7 and FIG. 8, a central position of each first area 201 overlaps with a central position of one of at least two corresponding first sub-pixels 101 adjacent in the row direction. FIG. 7 and FIG. 8 illustrate an example that each first area 201 corresponds to two first sub-pixels 101 adjacent in the row direction. The first sub-pixels r1 and r2 correspond to the light emitting area R. The first sub-pixels g1 and g2 correspond to the light emitting area G. The first sub-pixels b1 and b2 correspond to the light emitting area B. The first sub-pixels x1 and x2 correspond to the light emitting area X. FIG. 7 illustrates an example that each first area 201 overlaps with the first sub-pixels 101 on its left side. FIG. 8 is a schematic view after FIG. 7 rotates 90 degrees. It can be seen that after the screen rotates 90 degrees, three-dimensional display can still be realized by transforming the first sub-pixels 101 corresponding to each first area 201. Hence, such an implementation can realize three-dimensional display in two directions (landscape and portrait). However, such an implementation requires the viewer to change the viewing angle, i.e., the three-dimensional image can only be seen by forming a left viewing angle (FIG. 7) or a right viewing angle (FIG. 8) with the central normal of the screen.

Further, in such an implementation, the shape of the first areas 201 for example can be square, diamond or round. The length-width ratio of the first sub-pixels can be 1:1. The advantage of such settings lies in that the viewing distance of human eyes can remain unchanged after the screen is rotated, and the brightness of the screen is relatively uniform, the three-dimensional viewing effect will not have a big difference due to rotation of the screen, thereby being beneficial to ensure the viewing effect. Certainly, in specific implementation, the shape of the first areas 201 can also be other shapes, which will not be repeated here.

Further, as shown in FIG. 3a and FIG. 3b, the arrangement manner of the plurality of first sub-pixels in the liquid crystal display panel 100 can be transformed based on the positions of the plurality of first areas in the electroluminescent display panel. When the electroluminescent display panel is as shown in FIG. 2a, two adjacent rows of first sub-pixels in the liquid crystal display panel can be arranged in alignment, and can also be staggered by n first sub-pixels in the column direction. FIG. 3a shows the case in which the first sub-pixels are arranged in alignment. FIG. 6 shows the case in which the first sub-pixels are staggered by one first sub-pixel in the column direction. When the electroluminescent display panel is as shown in FIG. 2b, two adjacent columns of first sub-pixels in the liquid crystal display panel can be arranged in alignment, and can also be staggered by n first sub-pixels in the row direction. FIG. 3b shows the case in which the first sub-pixels are arranged in alignment.

Further, in the three-dimensional display device provided by embodiments of the present disclosure, under a two-dimensional display mode, the plurality of second areas 202 in the electroluminescent display panel 200 can be black areas, and can also be light emitting areas.

Specifically, when the plurality of second areas 202 in the electroluminescent display panel 200 are black areas in both the two-dimensional display mode and the three-dimensional display mode, each of the plurality of first areas 201 and each of the plurality of second areas 202 in the electroluminescent display panel 200 can be realized using second sub-pixels. The second sub-pixels in the second areas 202 are in a non-light emitting state. Or, each of the plurality of first areas 201 is realized using second sub-pixels, and each of the plurality of second areas 202 is realized using black matrix patterns arranged between the second sub-pixels, i.e., each of the plurality of second areas 202 is an area between the second sub-pixels covered by a black matrix.

Specifically, when the plurality of second areas 202 in the electroluminescent display panel 200 are light emitting areas under the two-dimensional display mode, and for example, when color filter is not arranged in the liquid crystal display panel, each second area 202 is a light emitting area that emits light of a same color as one of the first areas 201 adjacent to the second area in the row direction. For example, the second area 202 can emit light of the same color as the adjacent first area 201 on its left side. In such a case, each of the plurality of first areas 201 and each of the plurality of second areas 202 can be realized using second sub-pixels. When the second areas 202 are required to become black areas under the three-dimensional display mode, the second sub-pixels in the second areas 202 can be controlled in the non-light emitting state.

Based on the same inventive concept, embodiments of the present disclosure further provide a driving method of the above three-dimensional display device, comprising:

under a three-dimensional display mode, controlling a plurality of first areas in an electroluminescent display panel to perform light emitting display, and controlling a plurality of first sub-pixels of a liquid crystal display panel, so as to enable first sub-pixels corresponding to a the same first area to provide gray scale information of different viewpoint images and enable first sub-pixels corresponding to a same first area to display different gray scale information.

Further, in order to realize two-dimensional display, the driving method provided by embodiments of the present disclosure can further comprise: under a two-dimensional display mode, controlling first sub-pixels corresponding to a same first area in the liquid crystal display panel to display the same gray scale information.

Further, each of the plurality of first areas and each of the plurality of second areas can be a second sub-pixel, respectively. The driving method provided by embodiments of the present disclosure can further comprise: under a two-dimensional display mode, controlling each of the plurality of second areas in the electroluminescent display panel to perform the same light emitting display as one of two first areas adjacent to the second area in row direction.

Further, a central position of each first area can overlap with a central position of one of at least two corresponding first sub-pixels adjacent in the row direction. The driving method can further comprise: under a three-dimensional display mode, when it is determined that screen of the three-dimensional display device rotates, redetermining corresponding relations of the plurality of first areas and the plurality of first sub-pixels.

Embodiments of the present disclosure provide a three-dimensional display device and a driving method thereof. An electroluminescent display panel is used to replace the conventional backlight and is arranged under the liquid crystal display panel; thus, the whole three-dimensional display device can be light and thin. Under the three-dimensional display mode, a plurality of light emitting areas and a plurality of black areas arranged alternately in row direction and column direction are formed in the electroluminescent display panel, and the plurality of light emitting areas comprise repeatedly arranged R light emitting areas, G light emitting areas, B light emitting areas and X light emitting areas. Thus, a special shaped grating structure is formed. The electroluminescent display panel further has the function of postpositive three-dimensional gratings in addition to providing back light of the liquid crystal display panel, thereby saving the additional three-dimensional grating added in front of the liquid crystal display panel, which benefits the overall light and thin design of the three-dimensional display device and the prepositive liquid crystal display panel to add functions such as the touch function. Moreover, because the brightness of the electroluminescent display panel is approximately zero in the black state, the contrast of the black and white state is relatively high; hence, the three-dimensional gratings formed can easily obtain three-dimensional display of low crosstalk. Because each light emitting area (first area) in the electroluminescent display panel corresponds to at least two first sub-pixels adjacent in the row direction in the liquid crystal display panel, and the respective first sub-pixels are used for providing gray scale information of different viewpoint images, under the three-dimensional display mode, by controlling first sub-pixels corresponding to the same light emitting area (first area) for providing gray scale information of different viewpoint images to display different gray scale information, two different viewpoints (for example, two adjacent viewpoints) can receive images with different gray scale information. The left and right eye of a person will receive two different images when being located at two viewpoints respectively, which are then converged to one image in the brain by the vision of two eyes, so as to generate stereoscopic vision and realize naked eye 3D display of sub-pixel level.

Apparently, the skilled person in the art can make various amendments and modifications to the embodiments of the present disclosure without departing from the spirit and the scope of the present disclosure. In this way, provided that these amendments and modifications of the present disclosure belong to the scopes of the Claims attached and the equivalent technologies thereof, the present disclosure also intends to encompass these amendments and modifications.

The invention claimed is:

1. A three-dimensional display device, comprising:
a liquid crystal display panel; and
an electroluminescent display panel arranged under the liquid crystal display panel,
wherein the electroluminescent display panel comprises a plurality of first areas and a plurality of second areas, the plurality of first areas and the plurality of second areas are arranged in array and arranged alternately in row direction and column direction, under a three-dimensional display mode, the plurality of first areas are light emitting areas, the plurality of second areas are black areas, and the light emitting areas comprise repeatedly arranged R light emitting areas, G light emitting areas, B light emitting areas and X light emitting areas, and
wherein the liquid crystal display panel comprises a plurality of first sub-pixels arranged in array, at least every two first sub-pixels adjacent in row direction correspond to a first area, under the three-dimensional display mode, first sub-pixels corresponding to a same first area are used for providing gray scale information of different viewpoint images, and gray scales displayed by the first sub-pixels corresponding to the same first area are controlled to be different from each other to enable the three-dimensional display, wherein a central position of each first area overlaps with a central position of one of at least two corresponding first sub-pixels.

2. The three-dimensional display device as claimed in claim 1, wherein the electroluminescent light emitting display panel comprises a plurality of pixels, each pixel comprises an R light emitting area, a G light emitting area, an X light emitting area, a B light emitting area located in two adjacent rows or columns respectively.

3. The three-dimensional display device as claimed in claim 1, wherein under a two-dimensional display mode, gray scales displayed by first sub-pixels corresponding to a same first area are all same.

4. The three-dimensional display device as claimed in claim 1, wherein the liquid crystal display panel is a black and white liquid crystal display panel.

5. The three-dimensional display device as claimed in claim 1, wherein the X light emitting area is one of an R light emitting area, a B light emitting area, a G light emitting area, a Y light emitting area and a W light emitting area.

6. The three-dimensional display device as claimed in claim 1, wherein under a two-dimensional display mode, the plurality of second areas in the electroluminescent display panel are black areas.

7. The three-dimensional display device as claimed in claim 6, wherein each of the plurality of first areas is a second sub-pixel and each of the plurality of second areas is an area covered by a black matrix.

8. The three-dimensional display device as claimed in claim 1, wherein under a two-dimensional display mode, each of the plurality of second areas in the electroluminescent display panel is a light emitting area that emits light of a same color as one of two first areas adjacent to the second area in the row direction.

9. The three-dimensional display device as claimed in claim 6, wherein each of the plurality of first areas is a second sub-pixel and each of the plurality of second areas is a second sub-pixel.

10. The three-dimensional display device as claimed in claim 1, wherein a shape of the first area is square, diamond or round, and a length-width ratio of the first sub-pixel is 1:1.

11. A driving method of a three-dimensional display device, wherein the three-dimensional display device comprises a liquid crystal display panel; and
an electroluminescent display panel arranged under the liquid crystal display panel,
wherein the electroluminescent display panel comprises a plurality of first areas and a plurality of second areas, the plurality of first areas and the plurality of second areas are arranged in array and arranged alternately in row direction and column direction, under a three-dimensional display mode, the plurality of first areas are light emitting areas, the plurality of second areas are black areas, and the light emitting areas comprise repeatedly arranged R light emitting areas, G light emitting areas, B light emitting areas and X light emitting areas, and
wherein the liquid crystal display panel comprises the plurality of first sub-pixels arranged in array, at least every two first sub-pixels adjacent in row direction correspond to a first area, under the three-dimensional display mode, first sub-pixels corresponding to a same first area are used for providing gray scale information of different viewpoint images, and gray scales displayed by the first sub-pixels corresponding to the same first area are different from each other, wherein a central position of each first area overlaps with a central position of one of at least two corresponding first sub-pixels;
the method comprising:
under a three-dimensional display mode, controlling a plurality of first areas in the electroluminescent display panel to perform light emitting display, and controlling the plurality of first sub-pixels of a liquid crystal display panel, so as to enable first sub-pixels corresponding to a same first area to provide gray scale information of different viewpoint images and enable first sub-pixels corresponding to a same first area to display different gray scale information.

12. The driving method as claimed in claim 11, further comprising: under a two-dimensional display mode, controlling first sub-pixels corresponding to a same first area in the liquid crystal display panel to display same gray scale information.

13. The driving method as claimed in claim 11, wherein each of the plurality of first areas and the plurality of second areas is a second sub-pixel, the driving method further comprises: under a two-dimensional display mode, controlling each of the plurality of second areas in the electroluminescent display panel to perform the same light emitting display as one of two first areas adjacent to the second area in row direction.

14. The driving method as claimed in claim 11, wherein the driving method further comprises:
   under a three-dimensional display mode, when it is determined that screen of the three-dimensional display device rotates, redetermining corresponding relations of the plurality of first areas and the plurality of first sub-pixels.

15. The three-dimensional display device as claimed in claim 2, wherein a central position of each first area coincides with a central position of a line of centers of at least two corresponding first sub-pixels adjacent in the row direction.

16. The three-dimensional display device as claimed in claim 3, wherein a central position of each first area coincides with a central position of a line of centers of at least two corresponding first sub-pixels adjacent in the row direction.

17. The three-dimensional display device as claimed in claim 2, wherein a central position of each first area coincides with a central position of one of at least two corresponding first sub-pixels adjacent in the row direction.

18. The three-dimensional display device as claimed in claim 3, wherein a central position of each first area coincides with a central position of one of at least two corresponding first sub-pixels adjacent in the row direction.

* * * * *